United States Patent [19]
Cecchini

[11] 4,031,801
[45] June 28, 1977

[54] STRINGED MUSICAL INSTRUMENT

[76] Inventor: Jack Cecchini, 5344 N. Magnolia, Chicago, Ill. 60640

[22] Filed: May 17, 1976

[21] Appl. No.: 687,145

[52] U.S. Cl. .................................. 84/465; 84/173; 84/314; 84/485 R
[51] Int. Cl.² ........................................ G09B 15/06
[58] Field of Search ............ 84/173, 290, 291, 293, 84/297 R, 314, 465, 470, 485

[56] References Cited
UNITED STATES PATENTS

| | | | |
|---|---|---|---|
| 668,060 | 2/1901 | Shelton | 84/314 |
| 3,403,590 | 10/1968 | Quinton | 84/485 X |
| 3,494,240 | 2/1970 | Laselva et al. | 84/291 |

FOREIGN PATENTS OR APPLICATIONS 149,887  4/1904  Germany .............................. 84/465

Primary Examiner—Lawrence R. Franklin
Attorney, Agent, or Firm—Vogel, Dithmar, Stotland, Stratman & Levy

[57] ABSTRACT

A stringed musical device for teaching purposes in which a longitudinally extending member having dimensions similar to a guitar neck is provided with a head extending away therefrom with six machine heads mounted thereon for maintaining tension in the associated six strings. Frets are provided on one side of the member and four bridges are used to maintain different sets of tensions in the strings on the fret side and on the reverse side of the member such that fingering or left-hand playing for a normal guitar user may be practiced on the fret side and plucking or strumming may be practiced on the opposed side.

10 Claims, 3 Drawing Figures

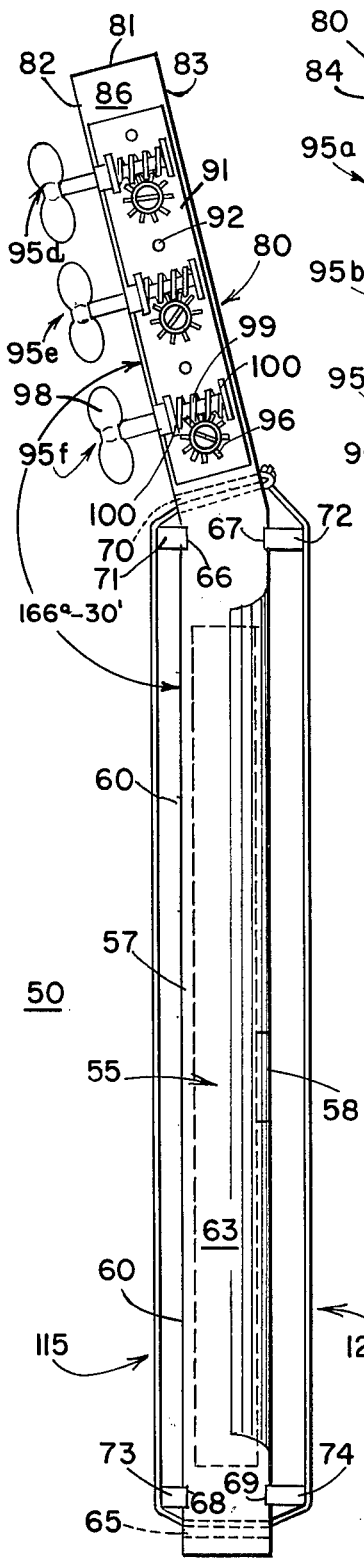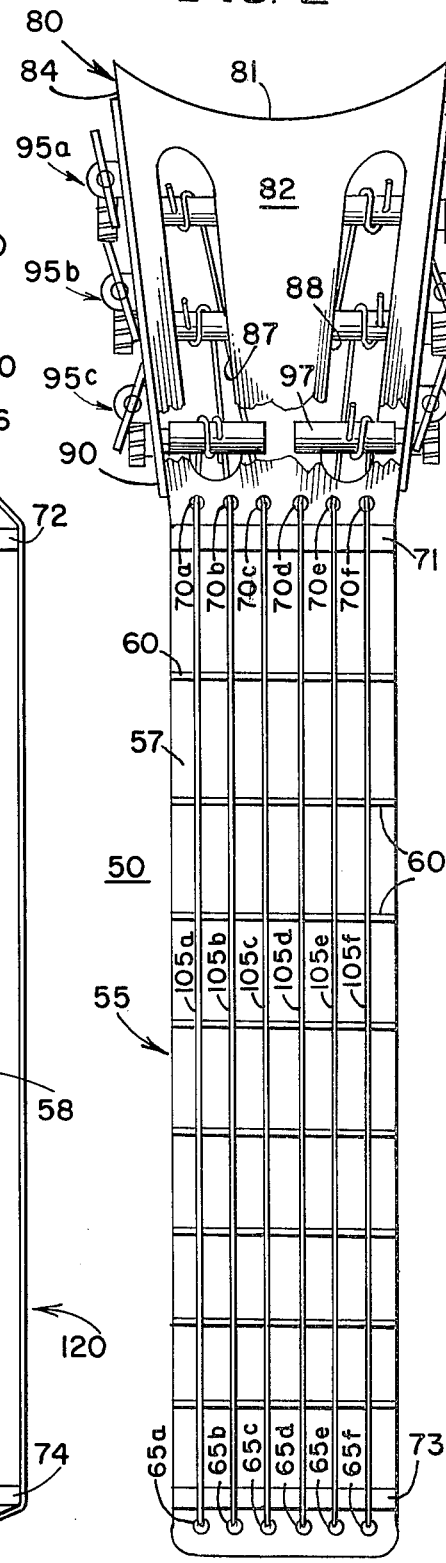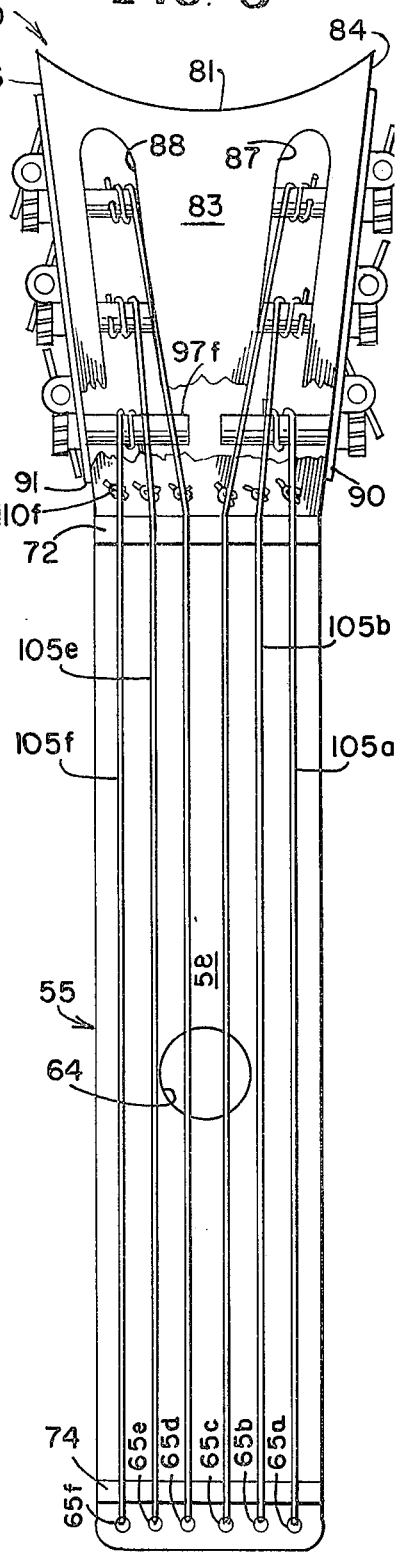

STRINGED MUSICAL INSTRUMENT

BACKGROUND OF THE INVENTION

There are many devices for teaching of guitar, mandolin, ukulele or other string instruments. One such prior art device is U.S. Pat. No. 2,145,718, issued to A. G. Finney, Jan. 31, 1939, For STRINGED MUSICAL INSTRUMENT, in which a movable slide is positioned on runners which along with a provided punch card is used to produce particular chords in particular keys of music. Another prior art patent representative of the field, is U.S. Pat. No. 3,218,904, issued to L. M. Hartman, Nov. 23, 1965, for GUITAR TRAINING DEVICE. This patent discloses a training device which is adapted to fit under the strings of a guitar neck and which contains identification for particular chords. Still another prior art device is disclosed in U.S. Pat. No. 3,494,240, issued Feb. 10, 1970, to A. G. Laselva et al., for SOUNDING BOX, in which a hollow box is provided with a single bridge and strings of different diameters to illustrate the physics involved in the production of tones.

All of these devices are adequate for their intended purposes, but none is particularly adapted to provide a teaching device for serious students of string instruments which allows the students to practice left-hand fingering and also right-hand strumming or plucking, while at the same time providing a device which is compact and which if desired, may be constructed to produce little sound.

SUMMARY OF THE INVENTION

This invention relates to a device for practicing both left-hand fingering and right-hand strumming which provides means for maintaining strings in different tensions for the fingering and for the strumming or plucking.

It is an important object of the present invention to provide a device which is compact and enables both left-hand fingering and right-hand strumming to be practiced thereon, which device is easy to string and handle.

Another object of the present invention is to provide a stringed device comprising a longitudinally extending member having dimensions similar to a guitar neck, spaced apart frets extending transversely of said member on one surface thereof, a plurality of longitudinally extending and transv.rsely spaced apart strings extending over the frets of the one surface and over and above the surface opposed to the one surface of the member, and means for maintaining one set of tensions in the strings extending over the one surface and another set of tensions in the strings extending over the opposed surface, whereby the strings extending over the frets and the one surface are useful in practicing fingering of chords and the strings extending over the opposed surface are useful in practicing strumming and plucking.

Another object of the present invention is to provide a device of the type set forth in which each string of the plurality of strings serves both a fingering function and a plucking or strumming function.

These and other objects of the present invention may be more readily understood by reference to the following specification taken in connection with the drawings, in which:

BRIEF DESCRIPTION OF THE DRAWINGS

FIG. 1 is a side elevational view of a device built in accordance with the present invention particularly illustrating both the fingering as well as the plucking or strumming functions thereof;

FIG. 2 is a top elevational view of the device shown in FIG. 1; and

FIG. 3 is a bottom elevational view of the device shown in FIG. 1.

DESCRIPTION OF THE PREFERRED EMBODIMENT

Referring to the drawings, and particularly to FIGS. 1 to 3, thereof, there is disclosed a device 50 which includes a longitudinally extending member 55 having the same general dimensions as a guitar neck but somewhat smaller, the member 55 having a flat surface 57 and an opposed arcuate back surface 58. It is understood, that the flat surface 57 will be referred to as the front surface and the surface 58 referred to as the back surface, but in use, either surface 57 or 58 may be front or back depending on whether strumming or plucking is being practiced or whether chord fingering is being practiced. The front flat surface 57 is provided with several transversely extending longitudinally spaced apart frets 60, the number of frets being the same as, in the preferred embodiment, the number of frets on a guitar neck. The member 55 may be provided with a sounding chamber 63 and a central opening 64 in the surface 58 leading thereto.

The member 55 is further provided with a plurality of spaced apart apertures 65a, 65b, 65c, 65d, 65e, and 65f near one end of the member, which apertures extend through the member 55 from the surface 57 to the surface 58 and are aligned in row configuration to form a plane normal to the longitudinally extending axis of said member. Four spaced apart grooves are provided in the member 55 with a groove 66 extending transversely across the member near one end thereof in the surface 57 and a groove 67 extending transversely across the member substantially opposite to the groove 66 in the surface 58, the grooves 66 and 67 lie in a plane normal to the longitudinal axis of member 55. Another groove 68 extends transversely across the member 55 in the surface 57 at the end opposite to the groove 66, inwardly of the row of apertures 65a-f, and a groove 69 extends transversely across the member 55 opposite the groove 68 in the rear surface 58, the groove 69 also being placed inwardly of the apertures 65a-f, and forming with the groove 69 a plane parallel to that formed by the grooves 66 and 67. Four bridges 71 through 74, are respectively fixedly secured in the grooves 66 through 69, and extend transversely across the member 55 and away therefrom at right angles, a predetermined distance to the surfaces 57 and 58. Specifically, bridges 71 and 73 upstand away from the surface 57 respectively in grooves 66 and 68, both the bridges 71 and 73 having the same vertical extent. Bridges 72 and 74 are respectively situated in grooves 67 and 69 and extend away from the rear surface 58 a predetermined extent. It is noted that both bridges 72 and 74 have the same vertical extent and the vertical extent of bridges 72 and 74 exceeds that of bridges 71 and 73.

A head 80 extends outwardly from the member 55 at a preferred angle of about 166°- 30 minutes and is provided with a plurality of aligned apertures 70a-f near the juncture of the head 80 and the member 55, the apertures 70a–f are in row configuration and lie in a plane normal to the longitudinally extending axis of the head 80.

Referring now to the head 80, there is disclosed a generally flat, wedge-shaped head 80 extending away from the member 55 at an angle of 160°– 30 minutes, an angle of 150° or greater being preferred. The head 80 has an arcuate end surface 81 and opposed surfaces 82 and 83. Side surfaces 84 and 86 complete the generally wedge-shaped structure. Spaced apart slots 87 and 88 extend longitudinally of the head parallel to the adjacent side wall, the slot being for a purpose hereinafter set forth. Side plates 90 and 91 are respectively mounted on the head sides 84 and 86 by means of fasteners 92. Six machine heads 95a through 95f are mounted on the side plates and each includes a gear wheel 96 rotatably mounted on a shaft 97 extending through an associated slot 87 or 88 and journaled in the head 80. The machine heads 95 also each include a key 98 constructed to facilitate manual turning, the key 98 being connected to a worm shaft 99 rotatably held to the side plate 90 and 91 by means of spaced apart brackets 100.

In the device 50 shown, six strings 105a to 105f are illustrated with each string having a holding device such as a knot 110a through f, positioned on the surface 83 of the head 80 and thereafter the string 105 extends through the associated aperture 70 across the bridge 71 and the bridge 73 above the surface 57 and thence through the associated aperture 65 across the bridge 74 and the bridge 72 thereby providing a reach above the surface 58 and thence to the associated machine head 95 and particularly the associated shaft 97. Tension is maintained in each string 105 by rotating the associated key 95 until the required tensions is obtained. As seen, each of the strings 105a through f, provides a fingering reach 115 lying above and over the surface 57 and a strumming or plucking reach 120 lying over and above the surface 58.

The tensioning mechanism is a combination of the angle between the head 80 and the member 55, the bridges 71 through 74, and the machine heads 95a–f, all of which combine to provide different tensions in the strings 105a–f along the fingering reach 115 as opposed to the plucking reach 120. Specifically, greater tension can be maintained in the plucking reach 120 than in the fingering reach 115, thereby to facilitate practice of fingering above the frets 60 while the tighter tension in the strumming reach 120 facilitates practicing of plucking and strumming.

The construction 50 of the present invention may be provided as illustrated with a hollow member 55 and sounding aperture 64, thereby to produce relatively loud tones or a solid member 55, thereby to produce relatively low tones for practice in motels and other public places.

In a construction model of the present invention, the member 55 can be made from wood and be solid or hollow as illustrated or be made of plastic and be solid or hollow, it being understood that operation of the device 50 will not alter if the member 55 is hollow, but merely increase the loudness of the tones produced when strumming the reach 120 of strings 105. The bridges 71 through 74 may be made of ivory or plastic or any other material that is recognized in the art, the construction of the machine heads 95 also being standard. The arcuate end surface 81 of the head 80 is to facilitate positioning the end 81 on thigh or shoulder to enable easy practicing with the device 50. The head 80 may be made of plastic or wood or any other suitable material and may be integral with the member 55 or connected thereto by suitable means. The apertures 65a through f and 70a through f, may be provided with grommets to prevent undue stress on the strings 105a through f, the grommets not being required but may be preferred depending upon the materials used for construction. The strings 105a through f, may be nylon or steel as is known in the art.

While the device 50 herein illustrated, is obviously for practice of the six string guitar, it is clear that the inventive concept covers practice for any stringed instrument in which plucking or strumming or fingering of chords is required and such instruments include the mandolin, the six-string guitar, the 12-string guitar and the ukulele. Violin practice is also possible.

While there has been provided what at present considered to be the preferred embodiment of the present invention, it will be understood that various modifications and alterations may be made therein without departing from the true spirit and scope of the present invention, and it is intended to cover in the appended claims all such modifications and alterations.

What is claimed is:

1. A stringed device, comprising a longitudinally extending member having dimensions similar to a guitar neck, spaced apart frets extending transversely of said member on one surface thereof, a plurality of longitudinally extending and transversely spaced apart strings extending over said frets above said one surface and over and above the surface opposed to said one surface of said member, and means for maintaining one set of tensions in said strings extending over said one surface and another set of tensions in said strings extending over said opposed surface, whereby said strings extending over said frets and said one surface are useful for practicing fingering of chords and said strings extending over said opposed surface are useful for practicing strumming and plucking.

2. The stringed device set forth in claim 1, wherein there are six strings.

3. The stringed device set forth in claim 1, wherein said member is hollow and has a sounding aperture extending through the opposed surface to increase the resonance produced by strumming or plucking.

4. The stringed device set forth in claim 1, wherein said tension maintaining means includes a head extending away from said member at an angle greater than about 150° and means for maintaining one end of the strings fixed and means connected to the other end of said strings for altering the tension thereof.

5. The stringed device set forth in claim 4, wherein said head includes an arcuate end surface to facilitate placement of said head on a users thigh or shoulder.

6. The stringed device set forth in claim 1, wherein each of said plurality of strings provides a fingering reach and a strumming or plucking reach.

7. The stringed device set forth in claim 1, wherein said tension maintaining means include four bridges with two bridges forming a plane normal to the longitudinal axis of said member near one end thereof and the other two bridges forming a plane normal to the longitudinal axis of said member near the other end thereof.

8. The stringed device set forth in claim 7, wherein the two bridges on said one side of said member extend away therefrom the same extent and the two bridges on the other side of said member extend away therefrom the same extent.

9. The stringed device set forth in claim 8, wherein the bridges on the other side of said member extend away therefrom a greater extent than the bridges on said one side to facilitate maintaining greater tension in the strings for strumming or plucking than in the strings for fingering.

10. A practice device, comprising a longitudinally extending member having dimensions similar to the neck of a stringed instrument, spaced apart frets extending transversely of said member on one surface thereof, means on said member for holding a plurality of longitudinally extending and transversely spaced apart strings over said frets above said one surface and over and above the surface opposed to said one surface, and means for maintaining one set of tensions in strings held by said holding means extending over said one surface and for maintaining another set of tensions in strings held by said holding means extending over said opposed surface, whereby strings held by said holding means extending over said frets and said one surface are useful for practicing fingering of chords and strings held by said holding means and maintained in tension by said tension means extending over said opposed surface are useful for practicing strumming and plucking.

* * * * *